United States Patent
Van Den Nieuwelaar et al.

(10) Patent No.: US 8,292,703 B2
(45) Date of Patent: Oct. 23, 2012

(54) SYSTEM AND METHOD FOR PROCESSING A CARCASS PART OF SLAUGHTERED POULTRY

(75) Inventors: Adrianus Josephes Van Den Nieuwelaar, Gemert (NL); Petrus Christianus Hendrikus Janssen, Wilbertoord (NL); Johannes Antoon Vincent Van Kippersluis, Ede (NL)

(73) Assignee: Stork PMT B.V., Boxmeer (NL)

( * ) Notice: Subject to any disclaimer, the term of this patent is extended or adjusted under 35 U.S.C. 154(b) by 471 days.

(21) Appl. No.: 12/593,230

(22) PCT Filed: Mar. 26, 2008

(86) PCT No.: PCT/NL2008/000090
§ 371 (c)(1),
(2), (4) Date: Oct. 26, 2009

(87) PCT Pub. No.: WO2008/118008
PCT Pub. Date: Oct. 2, 2008

(65) Prior Publication Data
US 2010/0120344 A1    May 13, 2010

(30) Foreign Application Priority Data

Mar. 27, 2007  (NL) .................................. 1033604

(51) Int. Cl.
*A22C 17/00* (2006.01)
(52) U.S. Cl. ...................................... 452/136
(58) Field of Classification Search .............. 452/125, 452/127–130, 54, 153–155, 165, 187–189, 452/166–169, 185, 170
See application file for complete search history.

(56) References Cited

U.S. PATENT DOCUMENTS

| 3,266,542 | A | 8/1966 | Paoli |
| 4,648,155 | A | 3/1987 | Burnett |
| 4,873,746 | A | 10/1989 | Scheier et al. |
| 6,283,847 | B1 | 9/2001 | Berry et al. |
| 6,986,707 | B2* | 1/2006 | Van Den Nieuwelaar et al. ............... 452/187 |
| 7,070,493 | B2* | 7/2006 | Hazenbroek et al. ........... 452/83 |
| 7,344,437 | B2* | 3/2008 | Van Den Nieuwelaar et al. ............... 452/187 |
| 7,357,707 | B2* | 4/2008 | de Vos et al. .................. 452/136 |
| 7,614,941 | B2* | 11/2009 | van den Nieuwelaar et al. ............... 452/185 |
| 7,824,251 | B2* | 11/2010 | van den Nieuwelaar et al. ............... 452/185 |

FOREIGN PATENT DOCUMENTS

EP         0 421 551 A    4/1991

* cited by examiner

*Primary Examiner* — Richard Price, Jr.
(74) *Attorney, Agent, or Firm* — Birch, Stewart, Kolasch & Birch, LLP (57) ABSTRACT

The invention relates to a system for processing a carcass part of slaughtered poultry, which carcass part comprises at least a part of the breast, the breast comprising at least a part of the breastbone and a part of the breast fillet.

The system according to the invention comprises a fillet harvesting device for harvesting the breast fillet present on the carcass part, and a detaching device for harvesting residual meat still present on the breastbone after harvesting of the breast fillet, and a conveyor with product carriers for conveying the carcass parts along a path, the fillet harvesting device and the detaching device being disposed along the path of the conveyor, and the detaching device being placed downstream of the fillet harvesting device, and comprising a collection means for collecting harvested residual meat.

23 Claims, 5 Drawing Sheets

SYSTEM AND METHOD FOR PROCESSING A CARCASS PART OF SLAUGHTERED POULTRY

BACKGROUND OF THE INVENTION

1. Field of the Invention
2. Background of the Invention

The invention relates to a system for processing slaughtered poultry.

Systems and methods for harvesting the breast fillet of a carcass part of slaughtered poultry, such as, for example, a front half or a breast cap, are known. Various techniques are used for harvesting breast fillets, such as scraping away the breast fillet, cutting away the breast fillet, or pulling away the breast fillet. Combinations of these techniques are also used. International patent application PCT/NL2006/000632 discloses, for example, a system in which the breast fillet is first cut away from the breastbone and is subsequently scraped away from the ribcage.

The known systems and methods for harvesting breast fillets have the disadvantage that residual meat and/or other residual tissue is/are left behind on the breastbone after the harvesting of the breast fillet. The types of residual tissue that are left behind on the breastbone and the location where they are left depend on the way in which the breast fillet has been harvested.

SUMMARY OF THE INVENTION

The object of the invention is to provide an improved system and an improved method for processing a carcass part of slaughtered poultry.

The system, in addition to having a fillet harvesting device, is provided with a detaching device, which is used for harvesting residues of usable meat left behind on the breastbone after harvesting of the breast fillet. It appears in fact that in the case of some methods of harvesting breast fillet a few grammes of usable residual meat are still left behind on the breastbone. Harvesting a few grammes of meat extra per carcass part can produce an extra yield of over 200,000 kg of meat a year.

In order to be able to harvest this residual meat, the detaching device is disposed downstream of the fillet harvesting device along the path of the conveyor with the product carriers.

A part of the breastbone comprises cartilage. This cartilage is a valuable raw material for pharmaceutical purposes. However, the pharmaceuticals industry sets high standards for the quality of the cartilage supplied. For instance, the cartilage must have all residual tissue, such as residual meat, bone membrane and tissue (such as tendons) which provided the anchorage of muscle tissue to the cartilage, removed from it.

Cartilage can be harvested by, for example, cutting it away, sawing it away or trimming it away from the rest of the breastbone. The harvesting can be performed automatically or manually.

Until now, automated harvesting from the breastbone of cartilage that meets the standards of the pharmaceuticals industry has not been possible. Manual removal of all further tissue present on the cartilage is labour-intensive and therefore greatly increases costs. The device and method according to the invention greatly reduce the costs of harvesting cartilage that meets the standards of the pharmaceuticals industry, because automation of the process is now possible.

The system and the method enable automated harvesting of cartilage which better meets the requirements of the pharmaceuticals industry.

In the breast of poultry each half of the breast fillet is connected to the breastbone. There is therefore an anchorage which connects the outer fillet (formed by the M. pectoralis) to the free edge of the crest of the breastbone. The tissue providing that anchorage is often left behind on the breastbone after the removal of the breast fillets, particularly if the breast fillets are cut away from the breastbone before the harvesting, as is the case, for example, in the method of breast fillet harvesting disclosed in NL 1030671 or PCT/NL2006/000632.

In an advantageous embodiment of the system according to the invention, the detachment of this anchorage tissue is achieved by means of a detaching device provided with one or more rollers. At least one of the rollers present is provided with a profile, which engages upon the anchorage tissue. The roller or rollers is/are disposed in such a way that they can rotate about their axial axis. The direction of rotation is selected in such a way that the anchorage tissue is pulled away from the breastbone after being gripped by the profile of one or more rollers.

In an advantageous variant of the detaching device with rollers, two rollers are used, each being provided with a helical profile. The distance between the rollers in this case is chosen in such a way that the profiles of the rollers intermesh, but in such a way that some space is still left between the rollers. The anchorage tissue is gripped by the intermeshing profiles, and the relative movement between the rollers and the product carrier with the carcass part to be processed ensures that the anchorage tissue is pulled away. The tissue which has been pulled away is discharged through the space between the rollers.

In one possible embodiment, two pairs of rollers (i.e. in total four rollers) are used. At least one roller of the pair of rollers is preferably provided with a profile, preferably with a helical profile.

When the anchorage tissue is being pulled away by the roller or rollers, a small piece of the red part of the top part of the breastbone can break off. However, this piece of bone is ground by the roller or rollers, so that it cannot be found as such in the harvested residual meat. Through the presence of these small pieces of bone, it is advantageous if the residual meat harvested in this way is filtered after harvesting, for example with a filter having 3-mm perforations. Such a filter is also suitable for separating usable residual meat and other tissue such as tendon tissue or other anchorage tissue.

Furthermore, filtering of the meat in combination with other embodiments of the system according to the invention can also be advantageous for the purpose of preventing undesired residual tissue or too large bone residues from being present in the harvested residual meat.

The one or more rollers can also be used for removing or harvesting other types of residual meat or residual tissue from other places on the breastbone.

In an advantageous embodiment, a pair of rollers disposed next to each other is used. The axial axes of the rollers are substantially parallel to each other and on the path of the carcass parts being carried by the product carriers at the position of the rollers.

In a further advantageous embodiment, the two rollers of the pair of rollers are provided with a profile, and the rollers of the pair of rollers are placed at a distance from each other which is such that the profiles of the two rollers intermesh.

The profiles can then seize the anchorage tissue on the free edge of the crest of the breastbone and pull it away from the breastbone.

The product carrier and/or the one or more rollers can preferably swivel relative to each other about an axis extending substantially perpendicularly to the path of the product carrier. This can be achieved, for example, by making the product carrier swivellable relative to the path or by disposing the one or more rollers swivellably in the detaching device. Through the fact that the roller or rollers and the product carrier can swivel relative to each other, the direction of the force exerted by the rollers upon the anchorage tissue in order to pull it away can be optimized.

In an advantageous embodiment, the detaching device comprises a scraper for scraping the residual meat off the breastbone. The shape of the scraper is preferably adapted to the anatomical shape of the breastbone.

It is not essential for the detaching device to comprise both one or more rollers and a scraper. It is also possible for one or more rollers alone or a scraper alone to be provided. The choice of use of rollers, a scraper or both depends, for example, on the type and location of the residual meat to be expected, the desired quality of the end product and/or the type of desired end product (residual meat, cartilage or both).

In one possible embodiment, the scraper is in the form of a plate with a substantially V-shaped recess. This recess is substantially shaped like the cross section of the crest of the breastbone. In this embodiment the residual meat is scraped off the breastbone by moving the breastbone and the scraper relative to each other in such a way that the crest of the breastbone is guided through the recess in the scraper. This can be achieved by, for example, disposing the scraper so that it is fixed or slightly spring-loaded relative to the path of the product carriers, and guiding the carcass parts to be processed along the scraper means of the product carriers. The scraper can be provided with a sharp scraping edge.

In an advantageous embodiment, the scraper is composed of two parts: a left-hand scraping element and a right-hand scraping element. The left-hand scraping element and the right-hand scraping element each scrape the residual meat off the breastbone on one side of the breastbone. The left-hand scraping element and the right-hand scraping element are preferably disposed in such a way that they can spring in a direction which is substantially perpendicular to the direction of the path of the product carriers at the position of the scraping elements. Natural variations in the shape and dimensions of the breastbone can be compensated for in this way.

In an advantageous variant of the embodiment with the left-hand scraping element and the right-hand scraping element, the two scraping elements are placed at a distance from each other which is less than the thickness of the crest of the breastbone. In the case of this variant, the left-hand scraping element and the right-hand scraping element can swivel resiliently about a vertical axis. When the crest of the breastbone reaches the scraping elements, it pushes the scraping elements aside as if they were swing doors. The spring-loaded fixing of the scraping elements ensures that the scraping elements remain resting closely against the breastbone in order to produce a good scraping action.

After residual meat has been separated from the breastbone, the harvested residual meat is collected. The harvested residual meat can be collected in, for example, a receptacle, but also, for example, on a conveyor belt, which takes the harvested residual meat to a point where it is packed or processed further.

When the breastbone has had all residual tissue removed from it, the cartilage can be harvested and sold to the pharmaceuticals industry.

The product carriers used in the system and the method according to the invention are preferably such that they swivel about one or more axes. Such a product carrier is disclosed in NL1014845 or in FIG. 1 of EP1430780. As an addition, or as an alternative, the parts of the detaching device which are intended to go into engagement with the carcass part to be processed can also be disposed so that they swivel.

BRIEF DESCRIPTION OF THE DRAWINGS

The system and the method according to the invention will be described in detail below in a non-limiting way with reference to the appended drawing.

In the drawing.

DETAILED DESCRIPTION OF THE PREFERRED EMBODIMENTS

Figure 1:
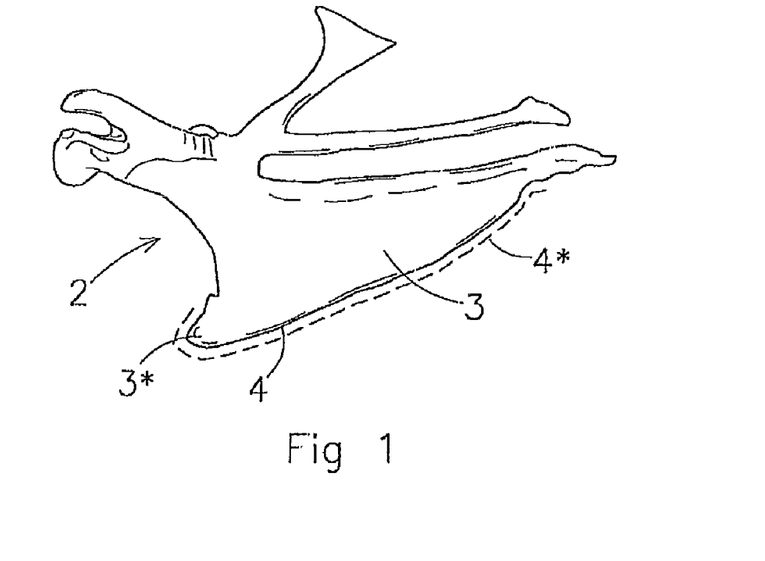
FIG. 1 is a diagrammatic view of the breastbone of poultry, in side view.

FIG. 1 shows diagrammatically a breastbone 2 of poultry. The breastbone 2 has a crest 3 (carina sterni). The muscle tissue forming the outer fillet, the M. pectoralis 7, is connected by means of anchorage tissue to the free edge 4 of the crest 3 of the breastbone 2. The dashed line 4* in FIG. 1 indicates the area over which the anchorage tissue extends.

Figure 2:
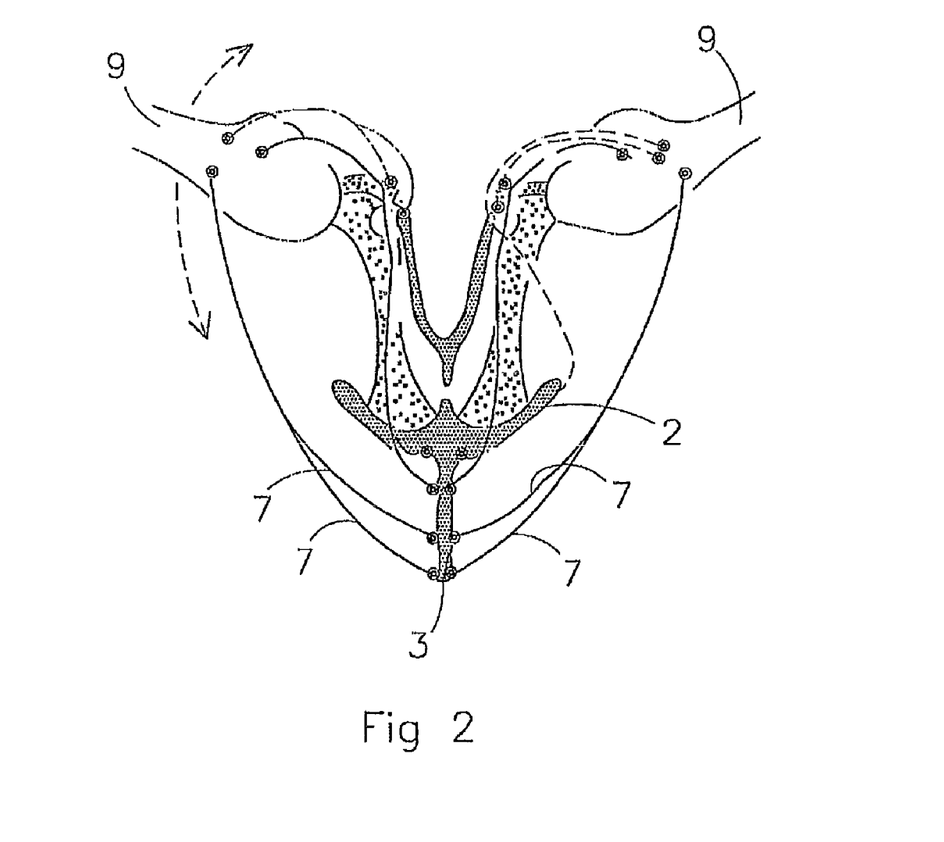
FIG. 2 is a diagrammatic view of the breastbone, the wings and the connections between them in poultry.

FIG. 2 is a diagrammatic view of the breastbone, the wings and the connections between them in poultry. Reference numeral 2 again shows the breastbone, with crest 3. M. pectoralis 7 connects the crest 3 of the breastbone 2 to wing 9.

Figure 3:
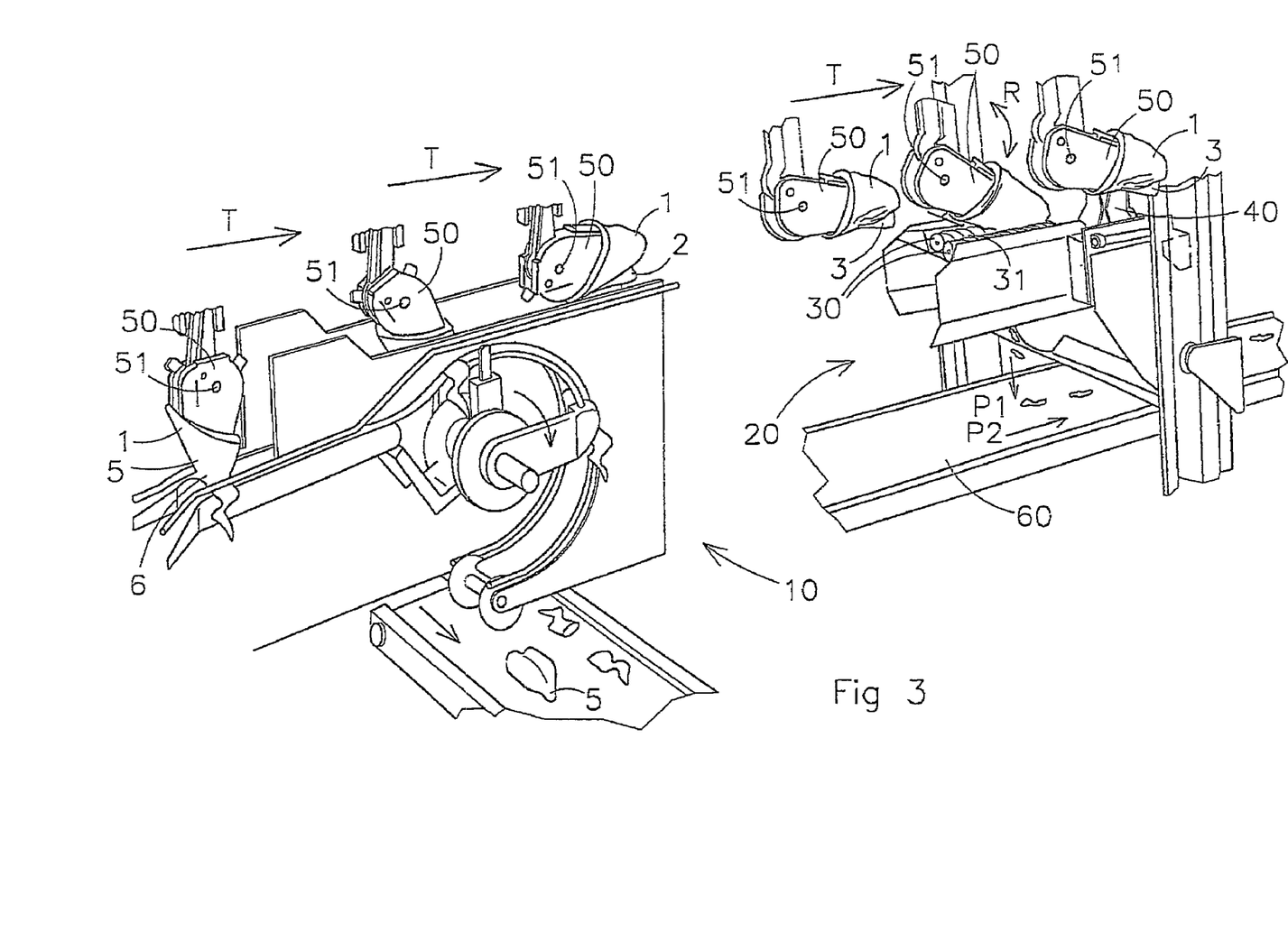
FIG. 3 is a diagrammatic overview of a possible embodiment of the method and the system according to the invention.

FIG. 3 shows a diagrammatic overview of a possible embodiment of the methods and the system according to the invention.

The carcass part 1 to be processed still comprises at least a part of the breast. The breast still comprises at least a part of the breastbone 2 and of breast fillet 5. Examples of such carcass parts 1 are breast caps and front halves. In the example of FIG. 3 front halves with wings are being processed.

The carcass part 1 to be processed is placed on a product carrier 50 of a conveyor. The conveyor moves the product carriers 50 along a path in direction of conveyance T. Disposed along the path are devices which process the carcass parts 1 placed on the product carriers 50.

The product carriers 50 in this exemplary embodiment can be swiveled about their axis 51. As an addition, or as an alternative, the parts of the detaching device which are intended to go into engagement with the carcass part to be processed can also be disposed so that they swivel.

In the example of FIG. 3 the product carrier disclosed in NL 1014845 is being used. This product carrier can be swiveled about a horizontal axis through at least 180° and about a vertical axis through 360°. However, it is also possible to use other product carriers.

The first device of the system according to FIG. 3 is a fillet harvesting device 10. This fillet harvesting device harvests the breast fillet. "Breast fillet" in this context is the meat that is sold as fillet; it is not necessarily the entire anatomical breast fillet formed by the M. pectoralis 7, in combination or without the inner fillet. It may be that during harvesting of the breast fillet small pieces of these muscles are left behind on the bones of the carcass part to be processed.

The fillet harvesting device 10 can be a fillet harvesting device which is known per se. In the example of FIG. 3 a fillet harvesting device according to EP1430780 is being used.

When the breast fillet is being harvested, residual tissue is left behind on the breastbone. That residual tissue can be usable residual meat, for example pieces of muscle meat. Other tissue can also be left behind on the breastbone, for example bone membrane, tendon tissue or other anchorage tissue. The amount of residual tissue, the type of residual tissue and where this residual tissue is situated are factors which depend on the chosen method of harvesting of the breast fillet.

In the method for harvesting breast fillet disclosed in PCT/NL2006/000632, a preliminary incision is made along the breastbone on either side. After that, the breast fillets are scraped away from the ribcage. By making the preliminary incision on either side of the breastbone, it is ensured that the anchorage tissue stays in place on the free edge 4 of the crest 3 of the breastbone 2. Usable residual meat which was situated between one of the blades by means of which the preliminary incision was made and the breastbone during the making of the incisions is also left behind.

There are two possible advantages in fully or partially removing residual meat and/or other residual tissue from the breastbone. First, if there is still residual meat left behind on the breastbone, it is often worthwhile to remove this meat as well. A few grammes extra in the yield of usable meat per carcass part soon mounts up to several hundred thousand kilos of extra meat a year for sale. Secondly, if all of the residual tissue can be removed from the breastbone, the cartilage of the breastbone can be harvested. This produces cartilage which meets the requirements of the pharmaceuticals industry.

Irrespective of whether the object of fully or partially removing residual meat and/or other residual tissue from the breastbone is the harvesting of residual meat or the harvesting of cartilage for pharmaceutical purposes, a detaching device 20 of the type shown in FIG. 3 can be used in all cases.

In the exemplary embodiment of FIG. 3 the detaching device 20 is disposed directly downstream of the fillet harvesting device 10, along the path of the product carriers 50. However, it is also possible for yet further processing stations which perform processing operations on the carcass part 1 to be placed between the fillet harvesting device 10 and the detaching device 20.

In the exemplary embodiment of FIG. 3 the detaching device 20 comprises two elements: rollers 30 and scraper 40.

For feeding into the detaching device 20, the product carrier 50 is swiveled about its swivel axis 51, in such a way that the carcass part is oriented with the longitudinal direction of the breastbone in the direction of conveyance and the crest 3 of the breastbone 2 facing downwards.

In the exemplary embodiment of FIG. 3 two rollers 30 are used. The rollers 30 are disposed parallel to each other. In this example each of the rollers 30 is provided with a profile 31. The rollers are placed at such a distance from each other that the profiles 31 intermesh.

During operation, the rollers rotate in opposite directions, in such a way that the profiles 31 of the rollers 30 grip tissue hanging from the breastbone 2 and pull it downwards. An example of such hanging tissue is the anchorage tissue on the free edge 4 of the crest 3 of the breastbone 2. The tissue that has been pulled away falls in the direction of arrow P1 onto conveyor belt 60, which removes the tissue in the direction P2 for further processing.

It is advantageous if the carcass part 1 to be processed and the rollers 30 can swivel relative to each other about a horizontal axis which is substantially perpendicular to the direction of conveyance T. In the example of FIG. 3 the product carrier 50 swivels about its axis 51, so that rotation in the direction R is possible. As an alternative, the rollers 30 can also be designed to swivel relative to the product carrier 50. A combination of the two is also possible. The advantage of the carcass part 1 to be processed being swivellable relative to the rollers 30 is that the carcass part 1 can be positioned in the optimum manner relative to the rollers 30 at any time during the processing operation.

FIG. 3 shows that when it is passing the rollers 30, the product carrier 50 swivels the carcass part 1 to be processed towards the rollers 30. This is performed in order to achieve optimum positioning of the carcass part 1 to be processed relative to the rollers 30.

As can be seen in FIG. 1, the anchorage tissue extends beyond the tip 3* of the crest 3 of the breastbone 2. When the profiles 31 of the rollers 30 grip the anchorage tissue, it does happen that the tip 3* of the crest 3 of the breastbone 2 breaks off. This piece of bone which has broken off in practice is often largely ground down between the profiles 31 of the rollers 30. If it is desirable for no bone parts to be left behind in the tissue removed, the tissue removed can be sieved and/or filtered (for example with a filter having perforations of about 3 mm in size) as a step in the further processing.

A scraper 40 is disposed downstream of the rollers 30. The scraper scrapes off residual meat present on the sides of the breastbone. In the example of FIG. 3 the residual tissue removed by the scraper 40 falls onto the same conveyor belt 60 as that on which the residual tissue removed by the rollers 30 falls. However, it is also possible for the residual tissue removed by the scraper 40 to fall onto a different conveyor belt from that of the residual tissue removed by the rollers 30. It is also possible for the removed residual tissue to be collected in one or more receptacles, instead of falling onto a conveyor belt. Residual tissue which has been removed by the rollers 30 can be collected in a different receptacle from that of the residual tissue removed by the scraper, or all of the residual tissue removed can be collected in the same receptacle.

Figure 4:
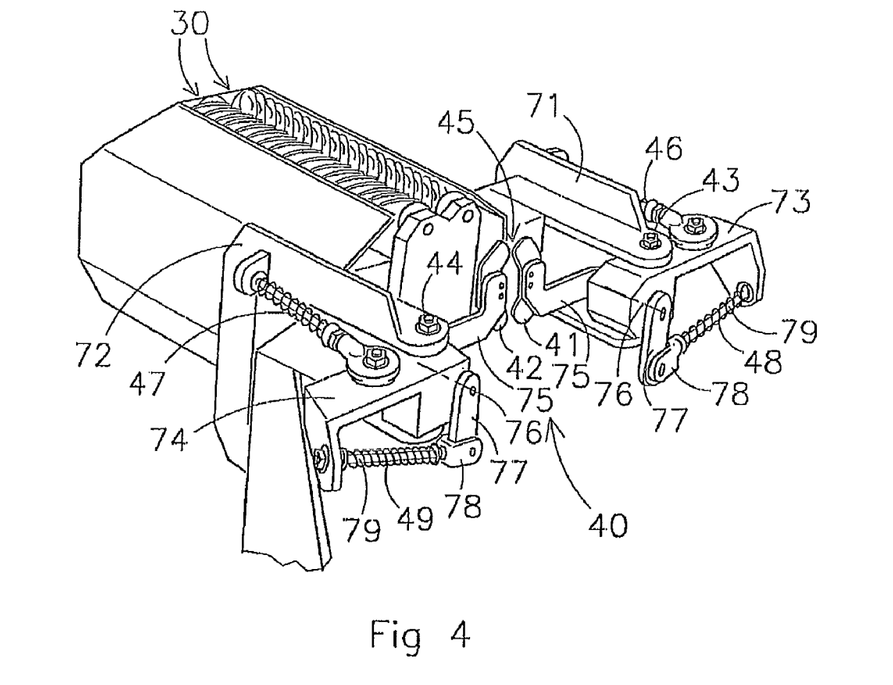
FIG. 4 is a first exemplary embodiment of a detaching device according to the invention.

FIG. 4 shows a first exemplary embodiment of a detaching device according to the invention.

The rollers 30 and the scraper 40 can be seen in FIG. 4. In the embodiment of FIG. 4 the scraper 40 comprises a right-hand scraper element 41 and a left-hand scraper element 42. A narrow opening 45 is present between the two scraper elements 41, 42. Opening 45 is preferably narrower than the thickness of the crest 3 of the breastbone. Right-hand scraper element 41 can be swiveled about swivel axis 43, and left-hand scraper element 42 can be swiveled about swivel axis 44. The scraper elements 41, 42 are preferably provided with a sharp scraping edge 70. Arms 71, 72 are disposed in a fixed position; arms 73, 74 can be swiveled about swivel axis 43 and swivel axis 44 respectively.

Each of the scraper elements 41, 42 is mounted on an arm 75. Said arm 75 is immovably connected to a shaft 76. A coupling plate 77 is immovably fixed on both shafts 76. Fork 78 ensures that spring rod 79 can be swiveled relative to coupling plate 77. This construction ensures that the scraping elements 41, 42 can make a movement in a substantially vertical plane. Springs 48, 49 provide mechanical resistance to an imposed vertical movement.

In an advantageous embodiment, shaft 76 is connected to the arm 75 and/or to the coupling plate 77 by means of an interlocked, preferably detachable connection. This makes the fitting easier.

The person skilled in the art will understand that other constructions are also possible for achieving a spring-loaded mounting of the scraper elements 41, 42. One example of this is a substantially direct fitting of the scraper elements on a coil spring or leaf spring, or the use of pneumatic or hydraulic cylinders for provision of the spring loading.

Figure 5:
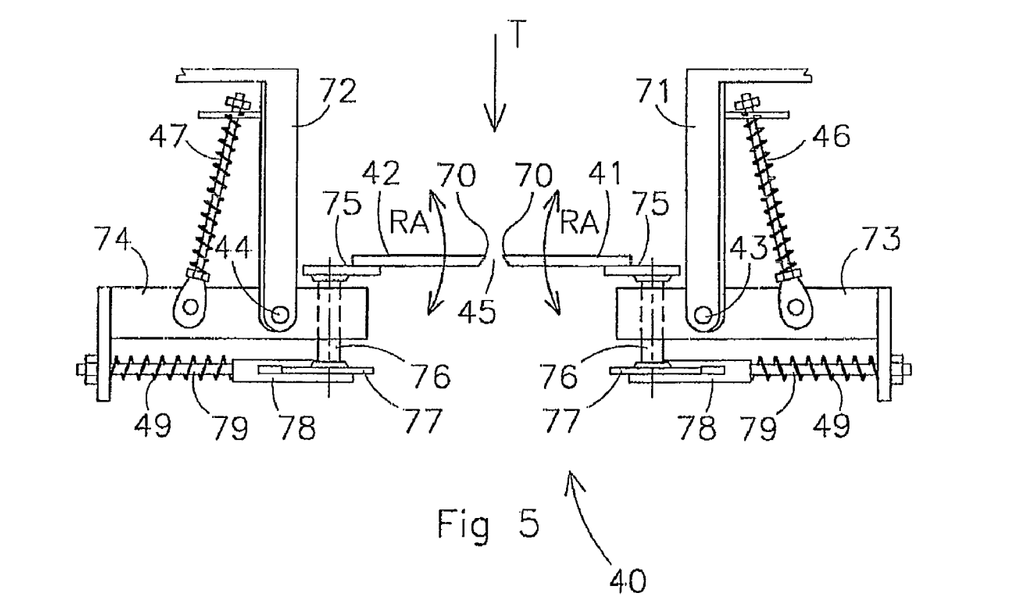
FIG. 5 is a top view of a scraper of the type shown in FIG. 4.

FIG. 5 shows a top view of the embodiment of the scraper shown in FIG. 4. In FIG. 5 arrow T indicates the direction of conveyance of the carcass parts to be processed.

A carcass part 1 to be processed approaches the scraper elements 41, 42 in the direction of arrow T. The crest 3 of the breastbone 2 goes into the opening 45 between the scraper elements 41, 42. Owing to the fact that in the preferred embodiment the crest 3 of the breastbone 2 is wider than the opening 45, the breastbone 2 pushes the scraper elements 41, 42 away in the direction of the arrows RA until the space between the scraper elements is wide enough to allow the crest of the breastbone to pass. The scraper elements 41, 42 here are resting firmly against the sides of the crest of the breastbone, irrespective of the natural variation in thickness of the crest of the breastbone in different carcass parts. The arms 73, 74 swivel along with the scraper elements 41, 42.

The crest 3 of the breastbone 2 is thicker near the tip 3\* than it is at some distance from the tip. The springs 46, 47 ensure that the scraper elements remain resting under some pressure against the sides of the crest of the breastbone. Springs 46, 47 also ensure that after the passing of a carcass part to be processed, the scraper elements 41, 42 return again to the idle position shown in FIG. 5.

Springs 48, 49 permit movement of the scraper elements 41, 42 in a vertical direction which is substantially perpendicular to the direction of conveyance T. Said springs 48, 49 ensure that the scraping edge 70 of the scraper elements 41, 42 remains in contact with the breastbone 2 through the fact that while it is passing, the breastbone 2 forces the scraper elements 41, 42 down against the force of the springs 48, 49.

Figure 6:
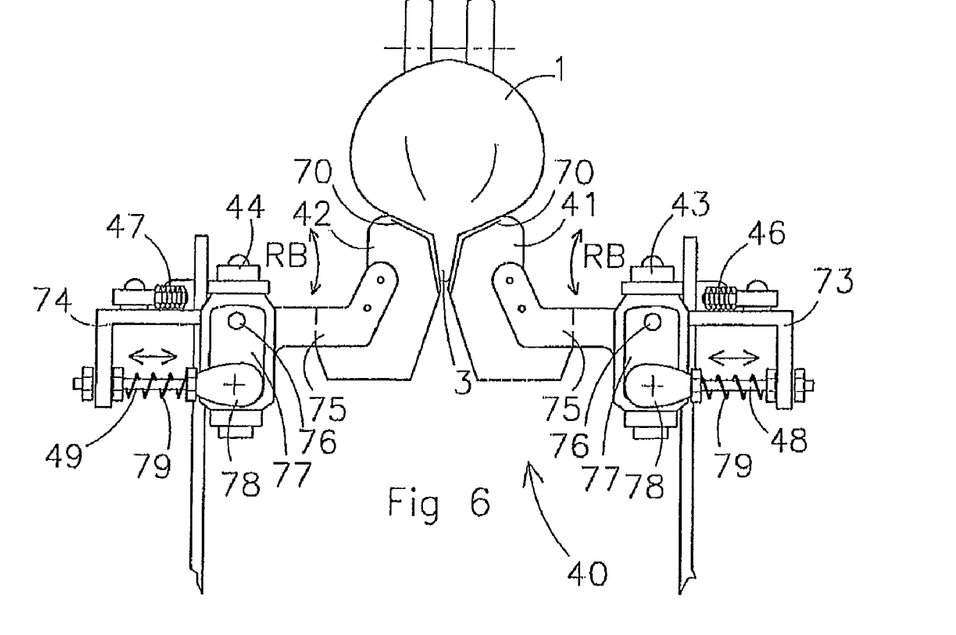
FIG. 6 is a front view of the scraper according to FIG. 5.

FIG. 6 shows a front view of the scraper of FIG. 5, viewed in the direction opposite to the direction of conveyance T. It can be seen clearly here that the scraper elements 41, 42 are resting tightly against the sides of the crest 3 of the breastbone 2.

In the example of FIG. 6, the scraping edge 70 also extends along the upper side of the scraper elements 41, 42. This option has the advantage that not only the crest of the breastbone, but also the part of the breastbone lying horizontally in this embodiment, the corpus sterni, is scraped clean.

Figure 7:
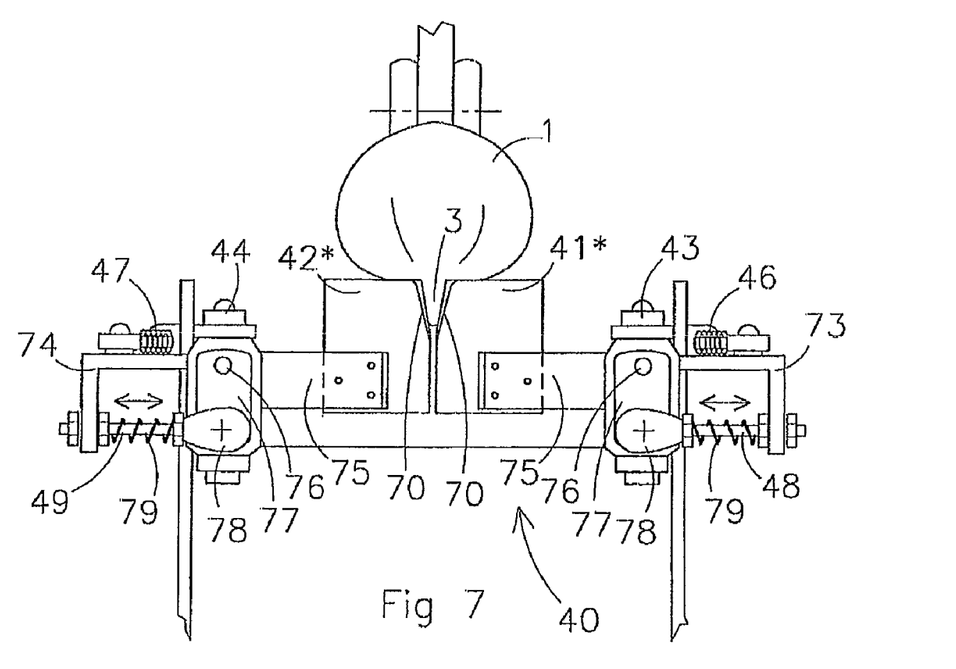
FIG. 7 is a variant of the scraper according to FIGS. 5 and 6.

FIG. 7 shows a variant of the scraper according to FIGS. 5 and 6. In this variant, the scraper elements **41\*, 42\* are shaped slightly differently from those in the embodiment of FIGS. 5 and 6. Where the same reference numerals as those in FIGS. 5 and 6 are used in FIG. 7**, they indicate parts having the same function.

Figure 8:
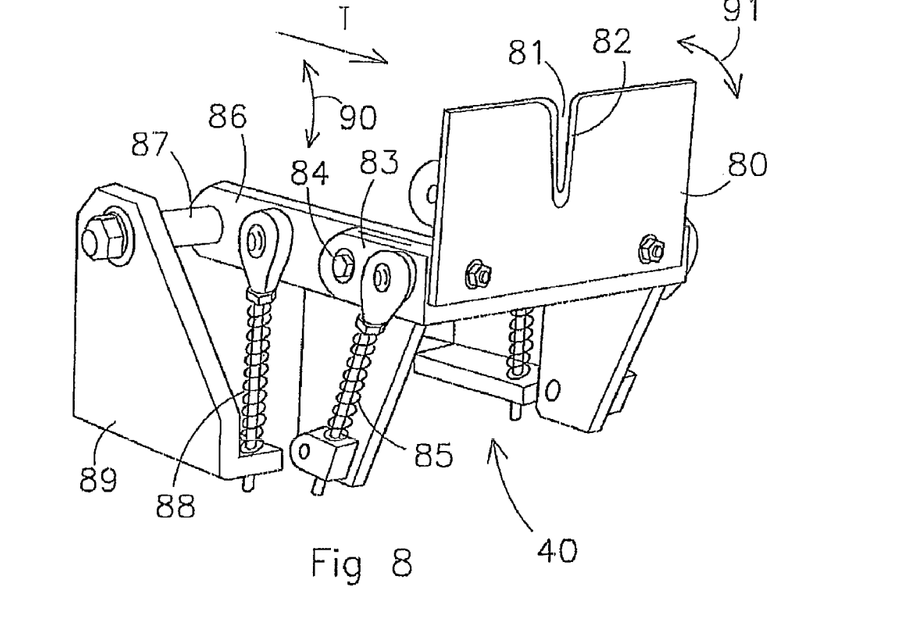
FIG. 8 is an alternative embodiment of the scraper.

FIG. 8 shows an alternative embodiment of the scraper 40. In the embodiment of FIG. 8, a single scraping element 80 is provided. The single scraping element 80 is provided with an opening 81 for allowing the crest 3 of the breastbone 2 to pass through. A scraping edge 82 is also present, for scraping away residual tissue present on the sides of the crest 3 of the breastbone. Arrow T again indicates the direction of conveyance.

The single scraping element 80 is connected to bracket 83. Bracket 83 can be swiveled relative to bracket 86 about swivel axis 84. Bracket 83 can be swiveled about swivel axis 87 relative to frame plate 89. Springs 85, 88 provide for resistance and for the return of the brackets to the initial position, which is shown in FIG. 8.

In an advantageous embodiment, the stiffness of springs 85 is selected to be lower than the stiffness of springs 88. A small passing carcass part 1 will consequently bring only springs 85 into operation, so that bracket 83 tilts relative to bracket 86. A larger carcass part 1 forces bracket 83 to its lowest position relative to bracket 86, after which the whole unit tilts further about axis 87 against the force of spring 88.

Figure 9:
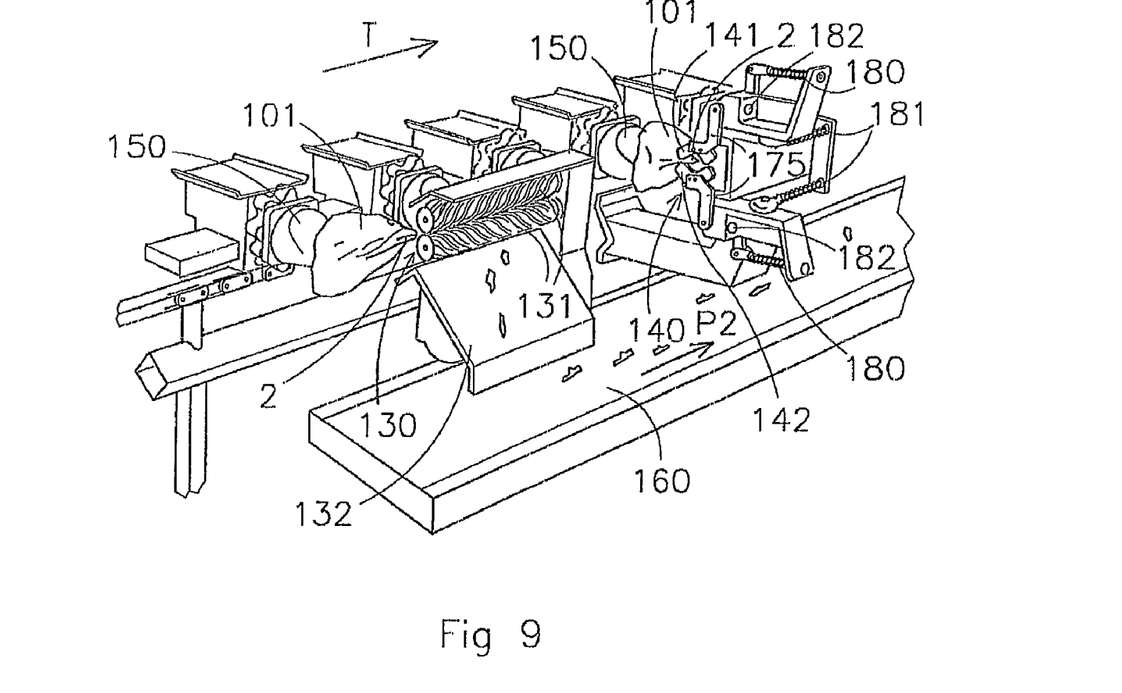
FIG. 9 is a second exemplary embodiment of a detaching device according to the invention.

FIG. 9 shows a second exemplary embodiment of a detaching device according to the invention.

In the example of FIG. 9, product carriers 150 are used for moving carcass parts 101 to be processed along a path in the direction of conveyance T.

The carcass parts 101 to be processed still comprise at least a part of the breast. When the carcass parts 101 to be processed reach the detaching device of FIG. 9, the breast fillet has already been harvested. The breastbone 2 is, however, still present.

In the example of FIG. 9, a different type of product carrier from that used in the first exemplary embodiment is used. In the example of FIG. 9, the product carrier can be swiveled only about a horizontal axis which is substantially perpendicular to the direction of conveyance T. This contrasts with the product carrier 50 shown in the first exemplary embodiment, which can swivel about a number of axes.

In the exemplary embodiment of FIG. 9 also, two rollers 130 are used to detach residual tissue, for example residual meat, from the breastbone 2. The rollers 130 in this example are both provided with a profile 131.

It can be seen in FIG. 9 that the rollers 130 are disposed in such a way that their axial axis extends substantially parallel to the direction of conveyance T. On account of the different orientation of carcass parts 101 to be processed, the rollers 130 are disposed above one another, and not next to one another.

Residual tissue removed by the rollers 130 is collected on slide plate 132. Owing to the slanting arrangement of the slide face 132, residual tissue, for example residual meat, slides onto conveyor belt 160, which discharges the removed residual tissue, for example residual meat, in direction p2 for further processing.

As an alternative, it is possible for a collection receptacle to be disposed below the slide plate 132 for the collection of removed residual tissue.

In an advantageous embodiment, the rollers 130 are pressed against the carcass part 101, for example by a spring force or by pneumatic cylinders, during the processing of the carcass part 101.

Scraper 140 is disposed downstream of the rollers 130. Scraper 140 comprises two scraping elements 141, 142. The scraping elements 141, 142 are connected by means of arms 175 to a spring-loaded construction. Springs 180 ensure that the scraping elements 141, 142 can spring in a horizontal direction, substantially perpendicular to the direction of conveyance T.

When the breastbone of a carcass part to be processed comes into contact with the scraping elements 141, 142, the width of the breastbone ensures that the scraping elements 141, 142 are forced away, against the action of springs 181, about the respective axes 182. The springs 181 in this case ensure that the scraping elements 141, 142 remain resting under pressure against the breastbone. After the breastbone has passed, the springs 181 ensure that the scraping elements 141, 142 return again to their initial position.

Residual tissue removed by the scraping elements 141, 142 also falls onto conveyor belt 160, which conveys it in direction P2 for further processing.

The invention claimed is:

1. System for processing a carcass part of slaughtered poultry, which carcass part comprises at least a part of the breast, the breast comprising at least a part of the breastbone and a part of the breast fillet, which system comprises:
    a fillet harvesting device for harvesting the breast fillet present on the carcass part, and
    a detaching device for harvesting residual meat still present on the breastbone after the harvesting of the breast fillet, and
    a conveyor with product carriers for conveying the carcass parts along a path, the fillet harvesting device and the detaching device being disposed along the path of the conveyor, and the detaching device being placed downstream of the fillet harvesting device, and
    a collector for collecting harvested residual meat.

2. System for processing a carcass part of slaughtered poultry, which carcass part comprises at least a part of the breast, the breast comprising at least a part of the breastbone and a part of the breast fillet, which system comprises:
    a fillet harvesting device for harvesting the breast fillet present on the carcass part, and
    a detaching device for removing residual tissue still present on the breastbone after the harvesting of the breast fillet, and
    a conveyor with product carriers for conveying the carcass parts along a path, the fillet harvesting device and the detaching device being disposed along the path of the conveyor, and the detaching device being placed downstream of the fillet harvesting device, and
    a cartilage harvesting station for harvesting at least the part of the breastbone which comprises cartilage.

3. System according to claim 1 or 2, in which the detaching device comprises a scraper for scraping the residual tissue off the breastbone.

4. System according to claim 3, in which at least a part of the scraper is spring-loaded.

5. System according to claim 4, in which the scraper comprises one or more scraping elements, at least one scraping element being spring-loaded, preferably in a direction substantially perpendicular to the longitudinal direction of the breastbone.

6. System according to claim 4, in which the scraper comprises one or more scraping elements, at least one scraping element being spring-loaded in a direction substantially parallel to the longitudinal direction of the breastbone.

7. System according to claim 1, in which the detaching device comprises at least one roller, the roller being provided with a profile for gripping tissue still present on the breastbone after the harvesting of the breast fillet.

8. System according to claim 7, in which the detaching device comprises at least two rollers, at least one roller being provided with a profile for gripping tissue still present on the breastbone after the harvesting of the breast fillet, and in which the rollers are disposed substantially parallel to each other.

9. System according to claim 8, in which at least two rollers are provided with a profile, and in which said at least two rollers are disposed relative to each other in such a way that the profiles of the rollers intermesh.

10. System according to claim 8, in which the rollers extend substantially in the direction of conveyance of the carcass parts.

11. System according to claim 1, in which the collector is a receptacle or a conveyor belt.

12. System according to claim 1, in which the fillet harvesting device comprises:
    a first blade for making a preliminary incision along the breastbone,
    a scraper for detaching the breast fillet from the bone parts of the carcass part,
    a second blade for breaking the tendon connection between breast fillet and breastbone,
    a breast fillet removal device for removing the breast fillet from the bone parts of the carcass part.

13. System according claim 1, in which the fillet harvesting device comprises:
    a blade for making a preliminary incision on either side of the breastbone, which preliminary incision leaves the membrane between inner fillet and outer fillet intact,
    a first scraper for scraping away the meat resting against the breastbone on either side,
    a second scraper for scraping off the ribcage a part of the meat of the inner fillet which is naturally present on the ribcage,
    a blade for cutting away the membrane connection between inner fillet and ribcage.

14. Method for processing a carcass part of slaughtered poultry, which carcass part comprises at least a part of the breast, the breast comprising at least a part of the breastbone and a part of the breast fillet, which method comprises the following steps:
    harvesting the breast fillet present on the carcass part by using a fillet harvesting device, and
    harvesting residual meat which is still present on the breastbone after the harvesting of the breast fillet by using a detaching device, and
    conveying the carcass part to be processed along a path from the fillet harvesting device to the detaching device by using a conveyor with product carriers, the fillet harvesting device and the detaching device being disposed along the path of the conveyor, and the detaching device being placed downstream of the fillet harvesting device, and
    collecting harvested residual meat.

15. Method for processing a carcass part of slaughtered poultry, which carcass part comprises at least a part of the breast, the breast comprising at least a part of the breastbone and a part of the breast fillet, which method comprises the following steps:
    harvesting the breast fillet present on the carcass part by using a fillet harvesting device, and
    removing residual tissue which is still present on the breastbone after the harvesting of the breast fillet by using a detaching device, and
    conveying the carcass part to be processed along a path from the fillet harvesting device to the detaching device by using a conveyor with product carriers, the fillet harvesting device and the detaching device being disposed along the path of the conveyor, and the detaching device being placed downstream of the fillet harvesting device, and
    harvesting at least the part of the breastbone which comprises cartilage.

16. Method according to claim 14 or 15, in which the harvesting of the breast fillet comprises at least the following steps:
  making a preliminary incision along the breastbone,
  detaching the breast fillet from the bone parts of the carcass part,
  breaking the tendon connection between breast fillet and breastbone,
  removing the breast fillet from the bone parts of the carcass part.

17. Method according to claim 14 or 15, in which the harvesting of the breast fillet comprises at least the following steps:
  making a preliminary incision on either side of the breastbone, which preliminary incision leaves the membrane present between inner fillet and outer fillet intact,
  scraping away the meat resting against the breastbone on either side by using a first scraper,
  scraping away at least a part of the meat of the inner fillet from the ribcage by using a second scraper,
  cutting away the membrane connection between inner fillet and ribcage,
  removing the outer fillet and the inner fillet from the bone parts of the carcass part, with the connection between inner fillet and outer fillet remaining intact.

18. Method according to claim 14 or 15, the method furthermore comprising the step of grinding any pieces of bone which may have come away with the harvested residual meat.

19. Method according to claim 14 or 15, the method furthermore comprising the step of filtering the harvested residual meat.

20. Method according to claim 14 or 15, in which at least a part of the residual tissue, for example at least a part of the residual meat, is detached from the breastbone by using two or more rollers.

21. Method according to claim 20, in which at least one of the rollers is provided with a substantially helical profile.

22. Method according to claim 14 or 15, in which at least a part of the residual tissue, for example at least a part of the residual meat, is detached from the breastbone by scraping.

23. Method according to claim 22, in which during the scraping one or more scraping elements is/are pressed against the breastbone.

* * * * *